Aug. 26, 1969       D. R. SMITH       3,463,375
FEED MEANS FOR CIGAR OVERWRAPPING AND BANDING MACHINE
Original Filed July 26, 1965        15 Sheets-Sheet 10
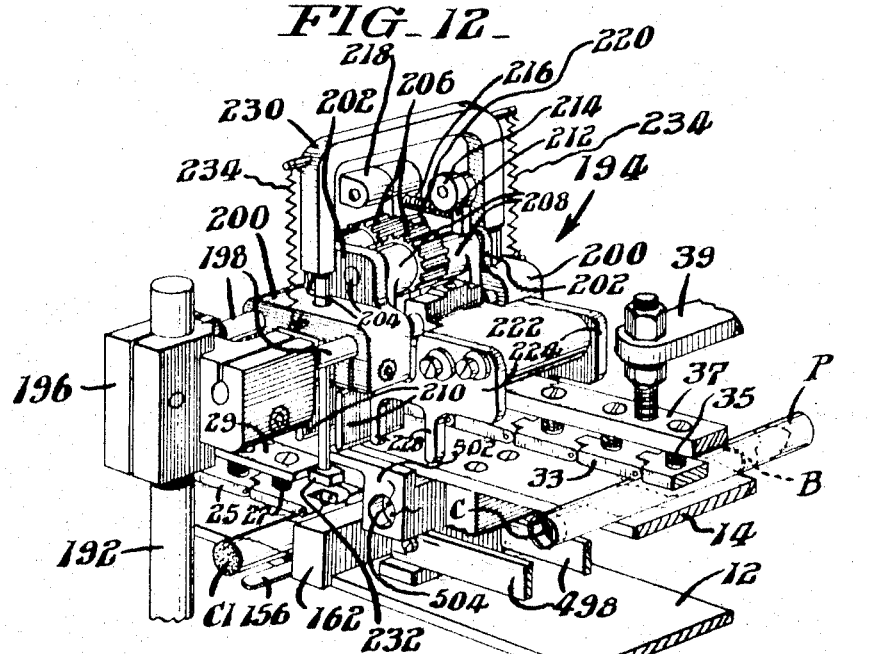
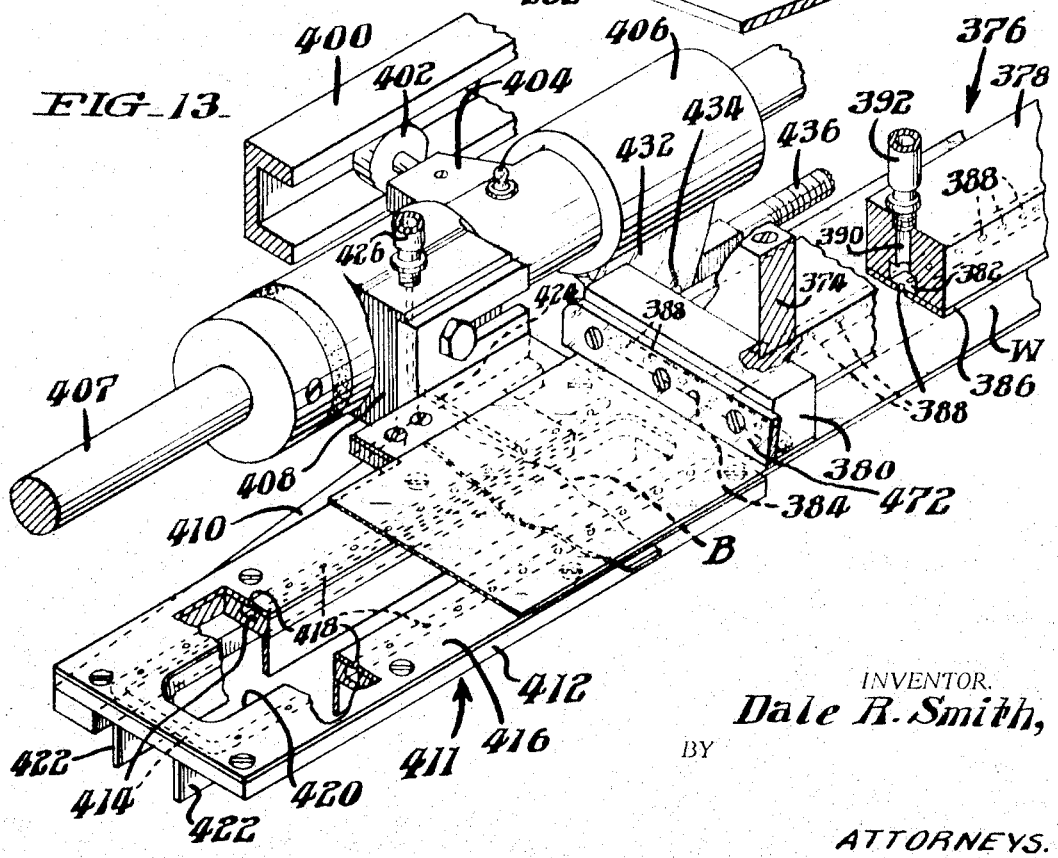
INVENTOR.
Dale R. Smith,
BY
ATTORNEYS.

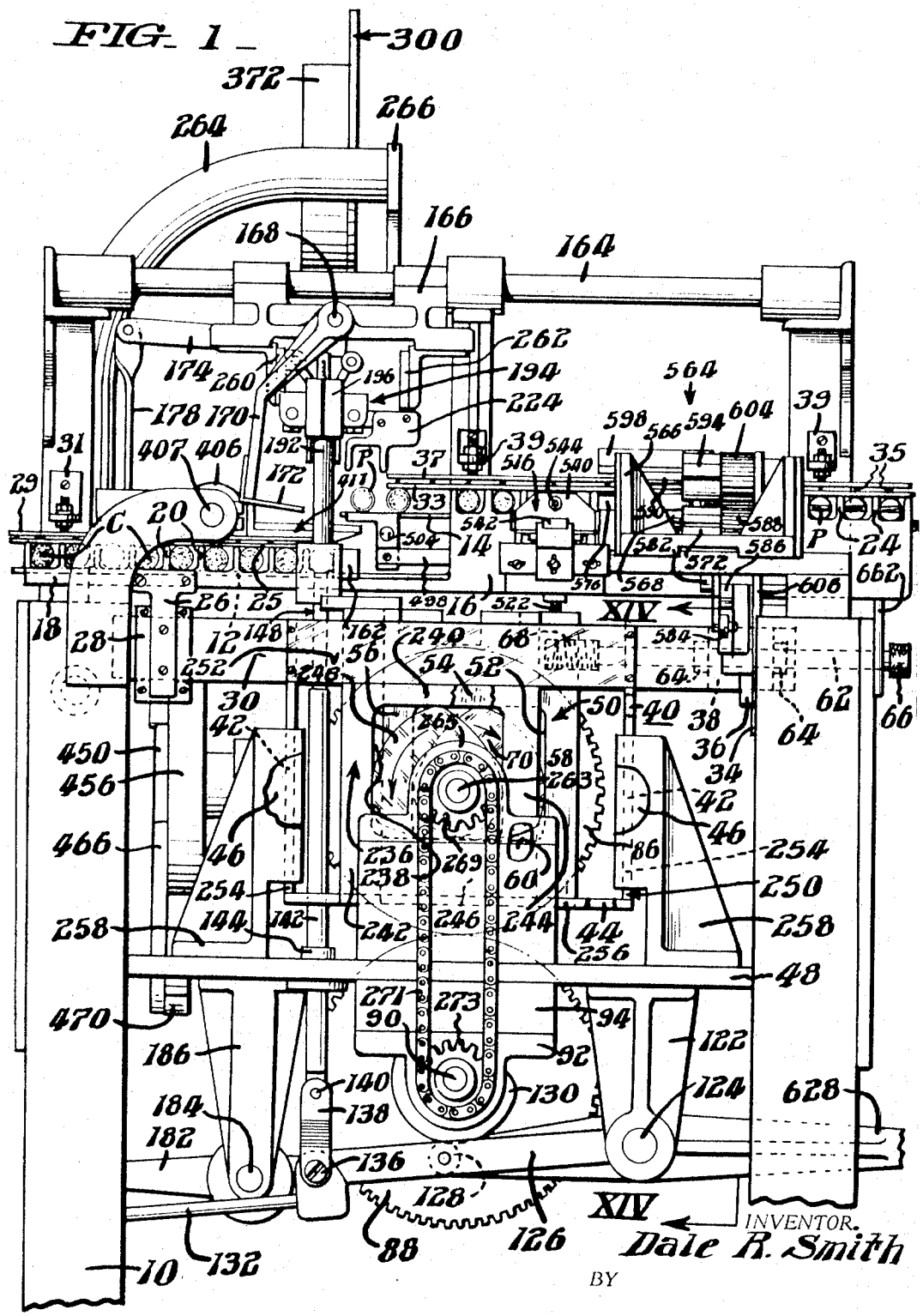

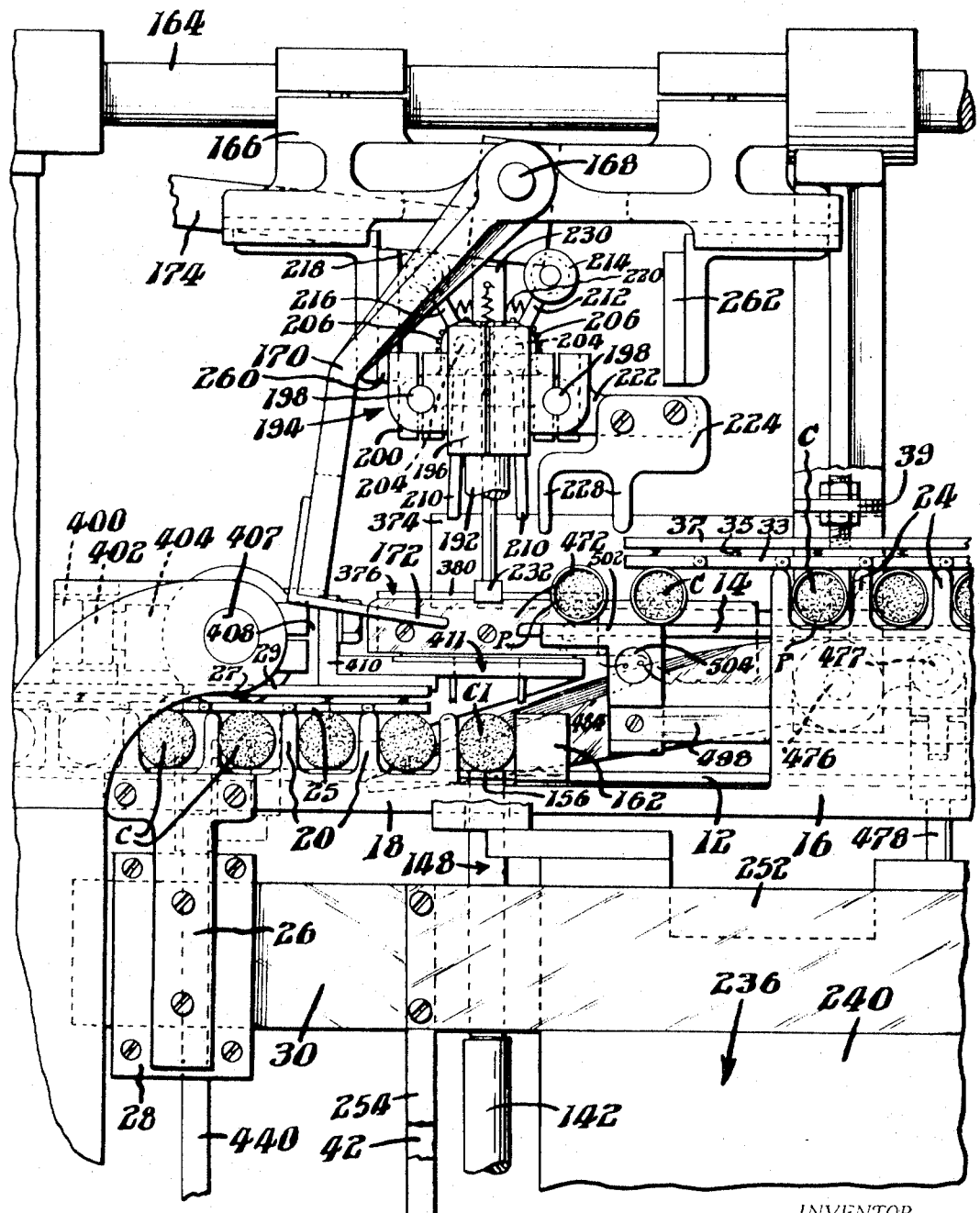

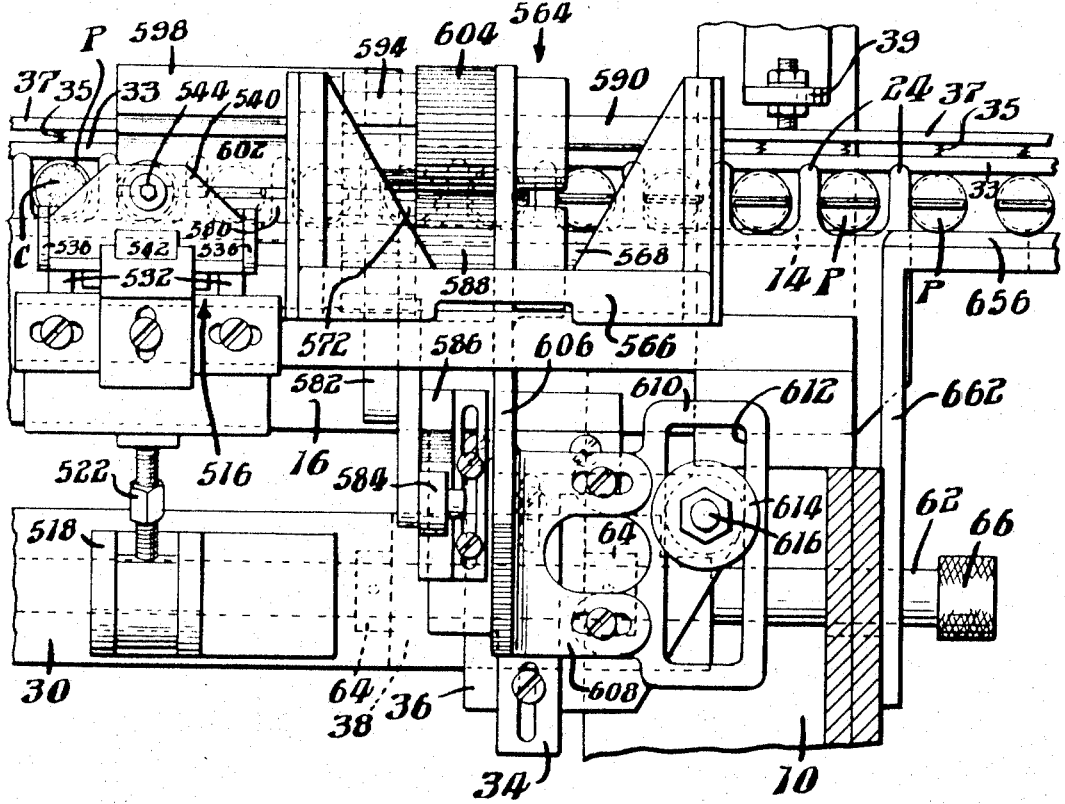

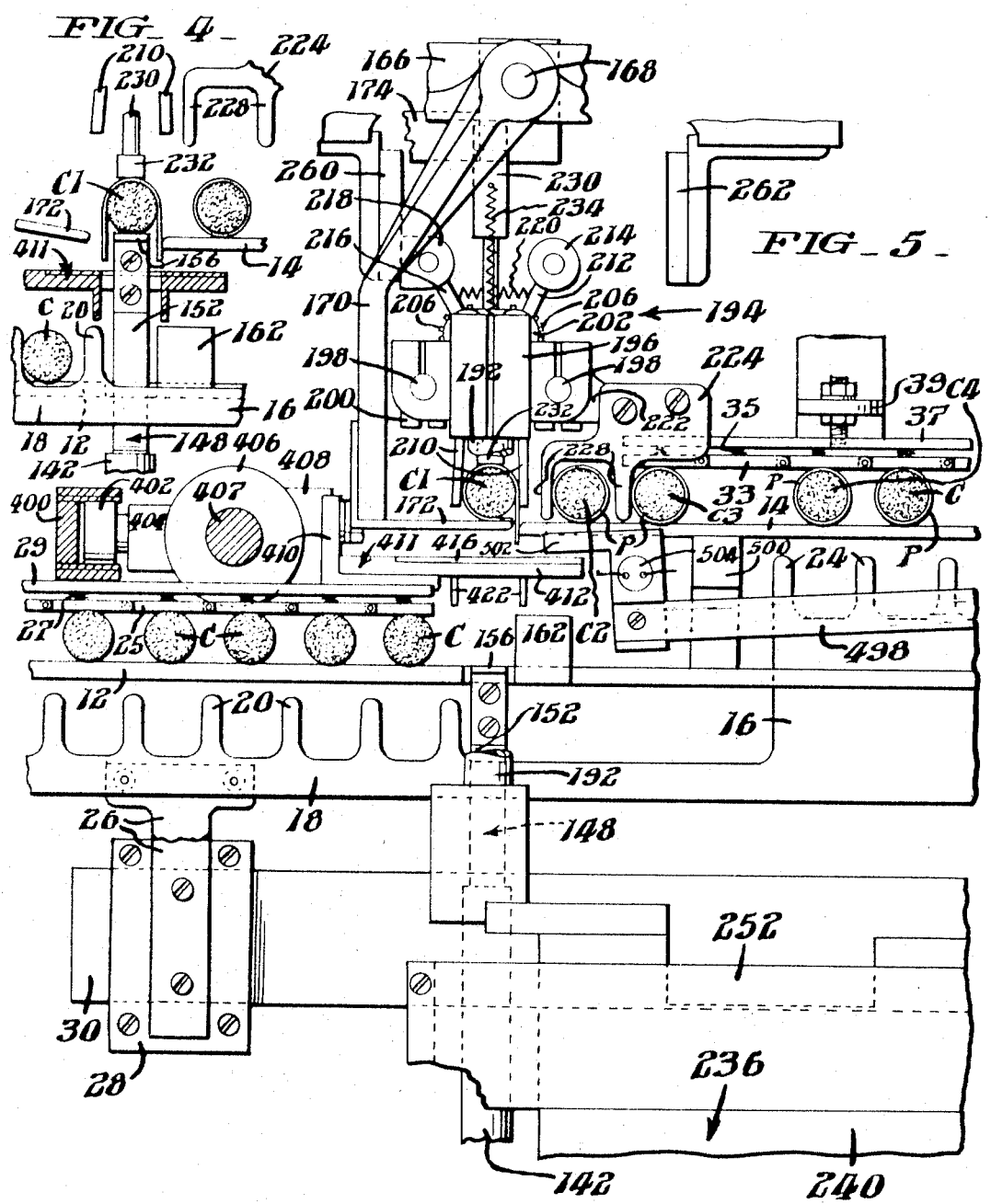

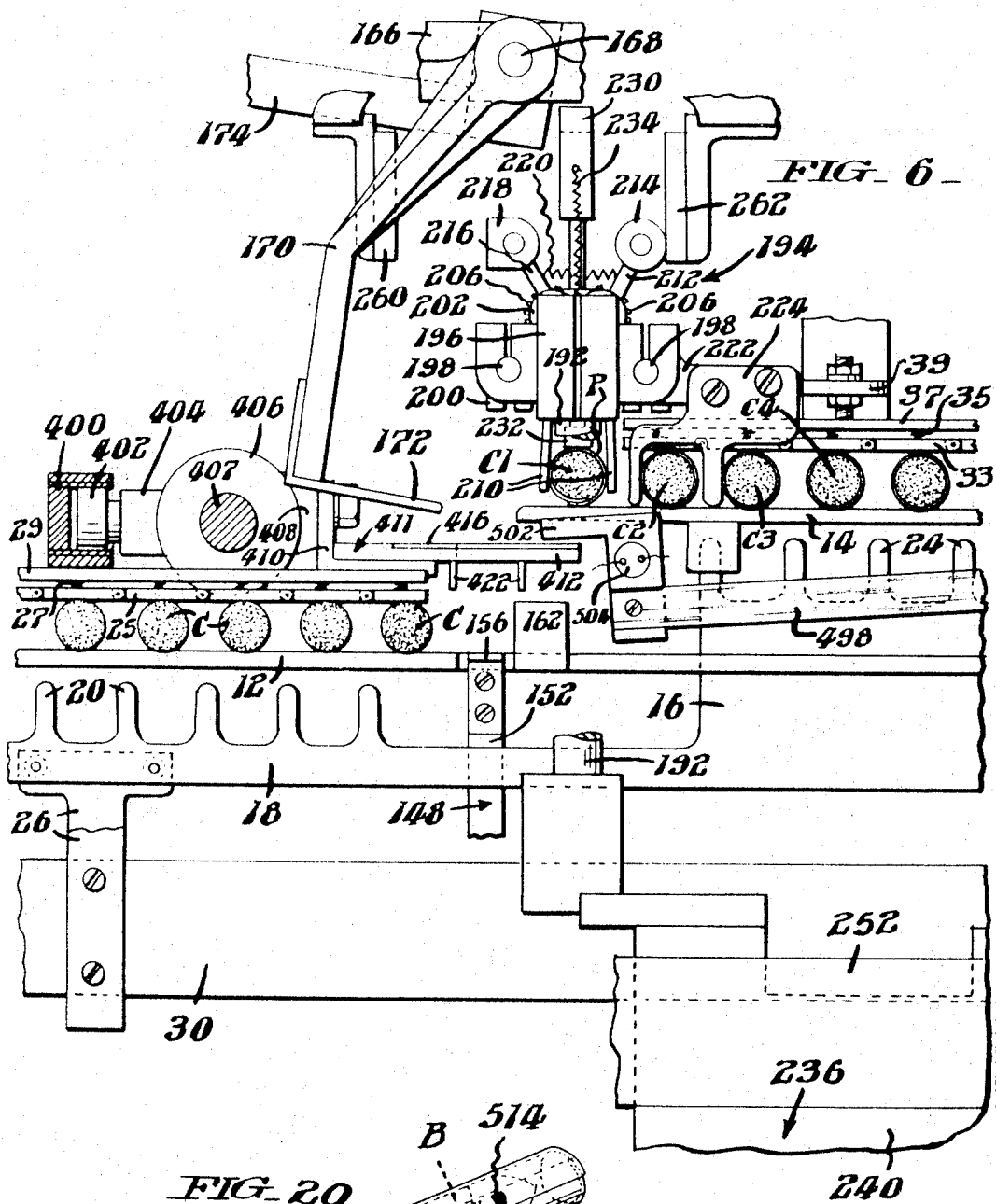

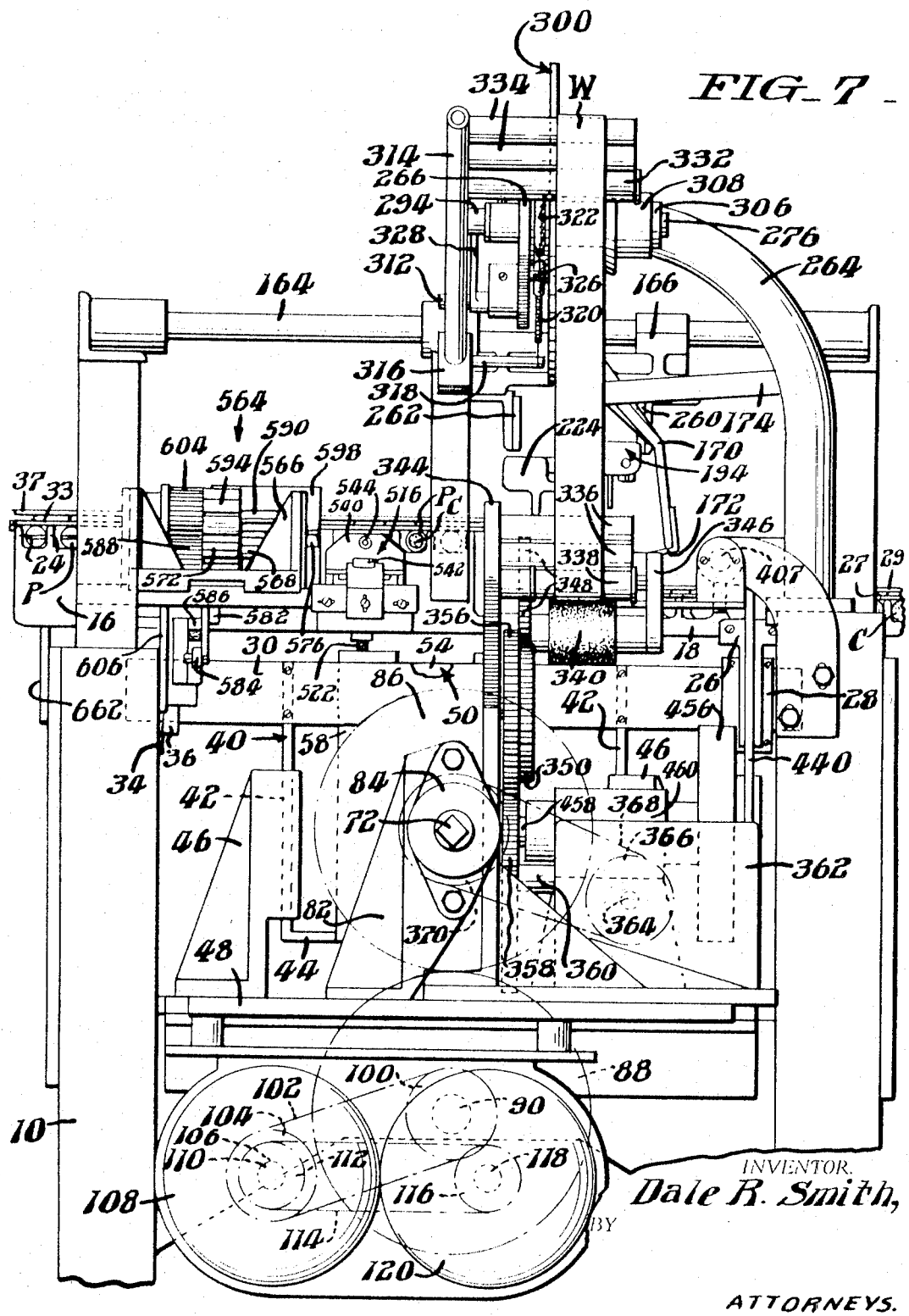

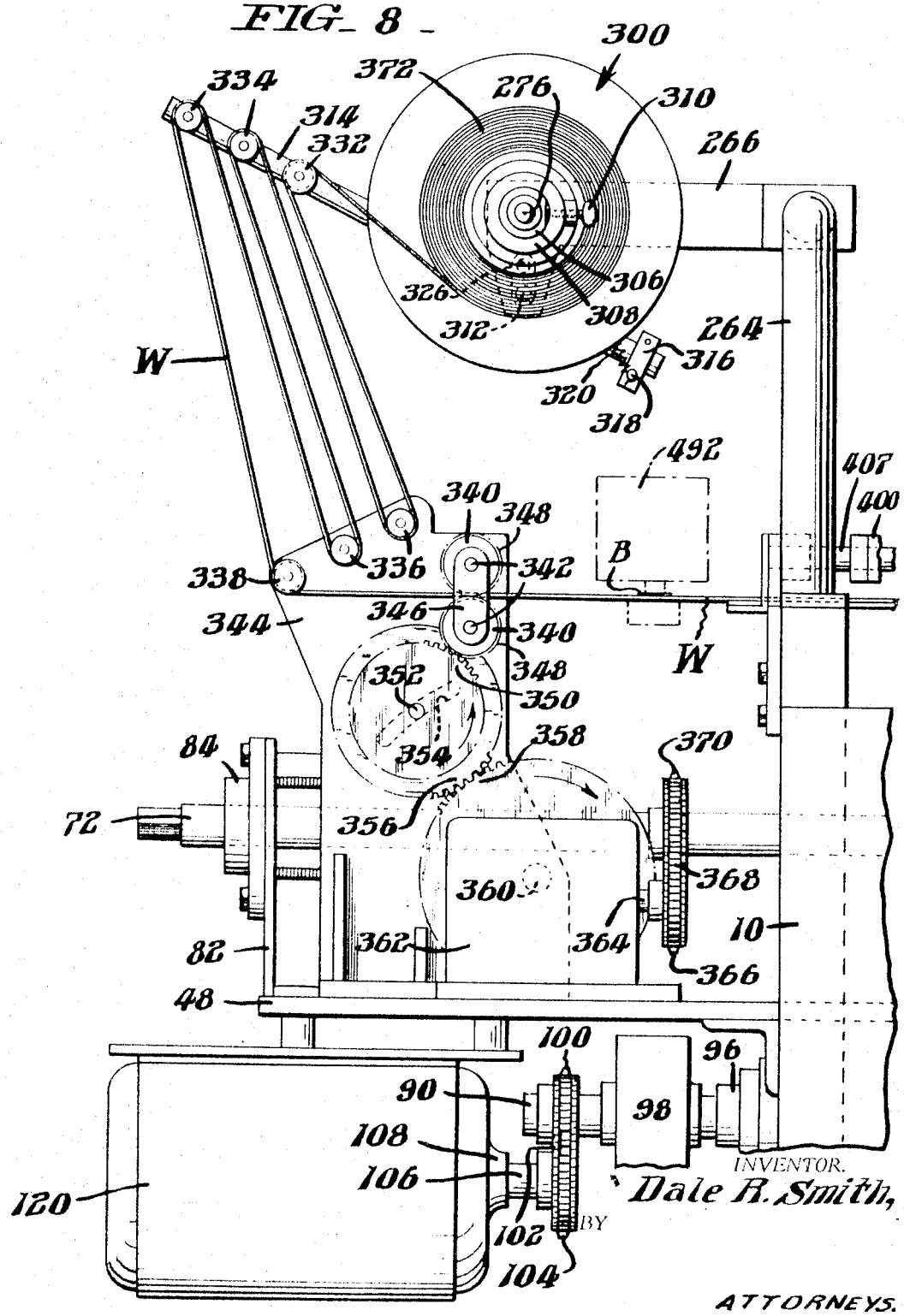

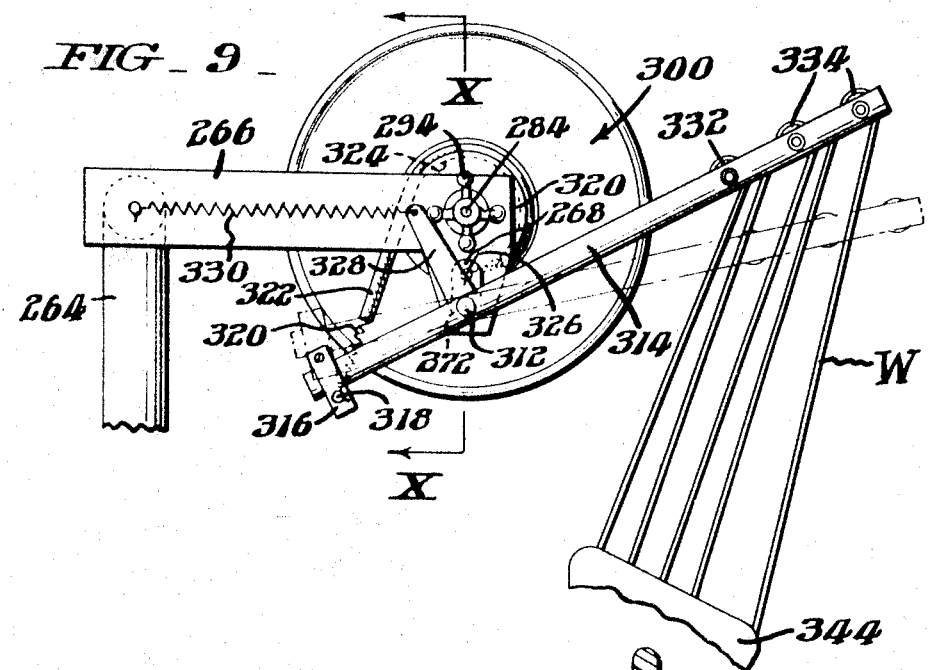
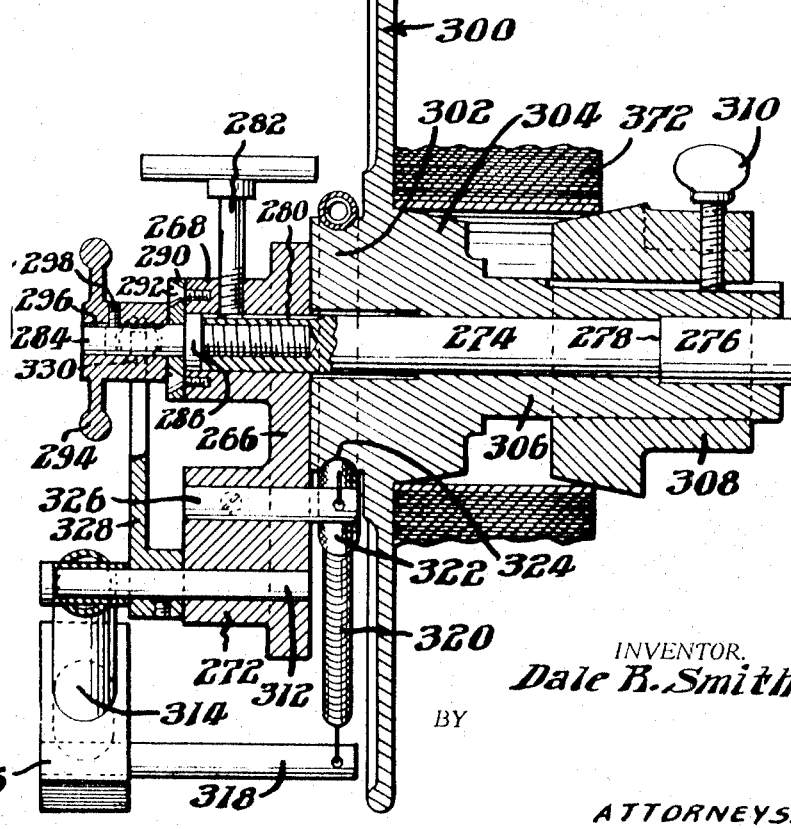

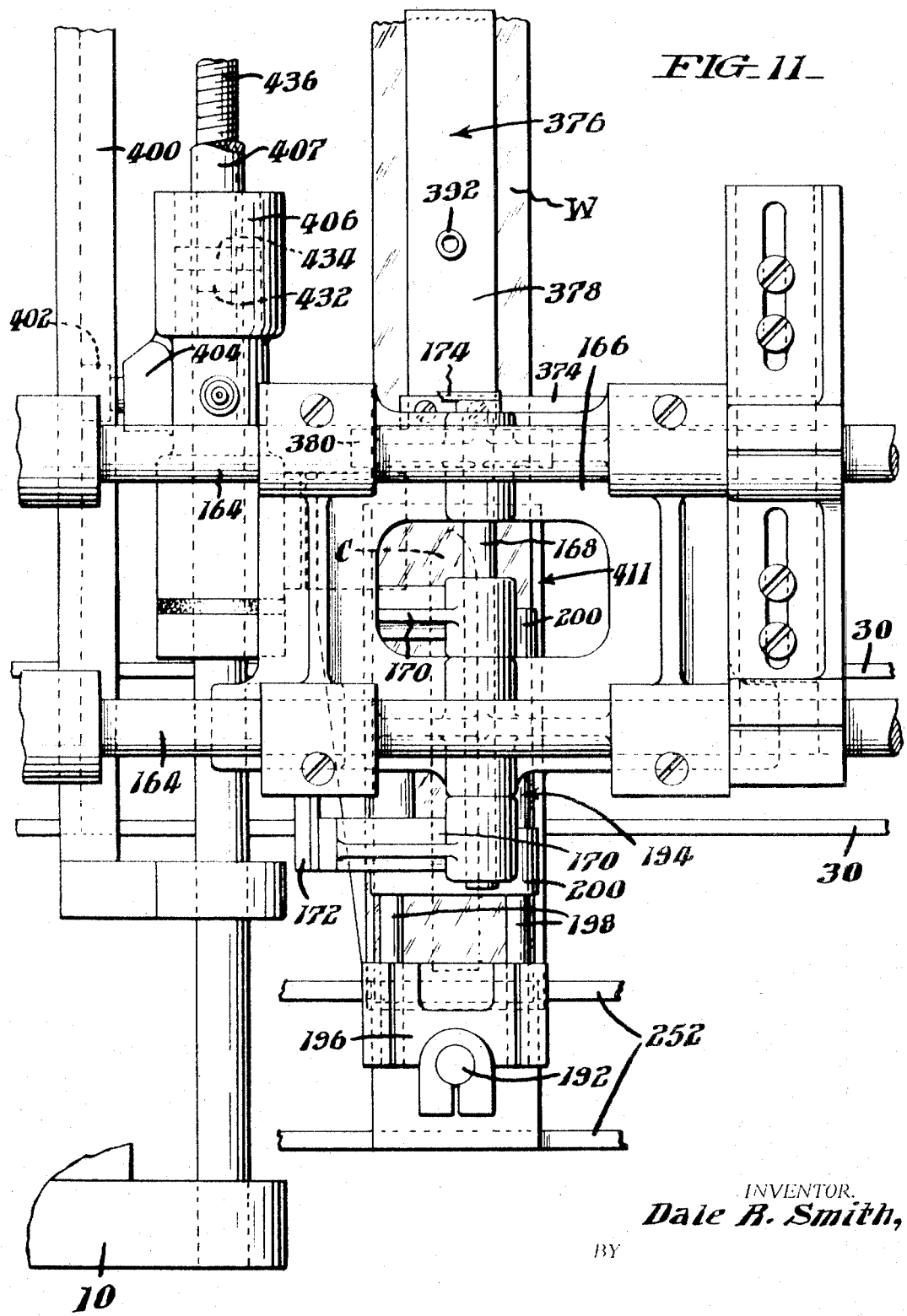

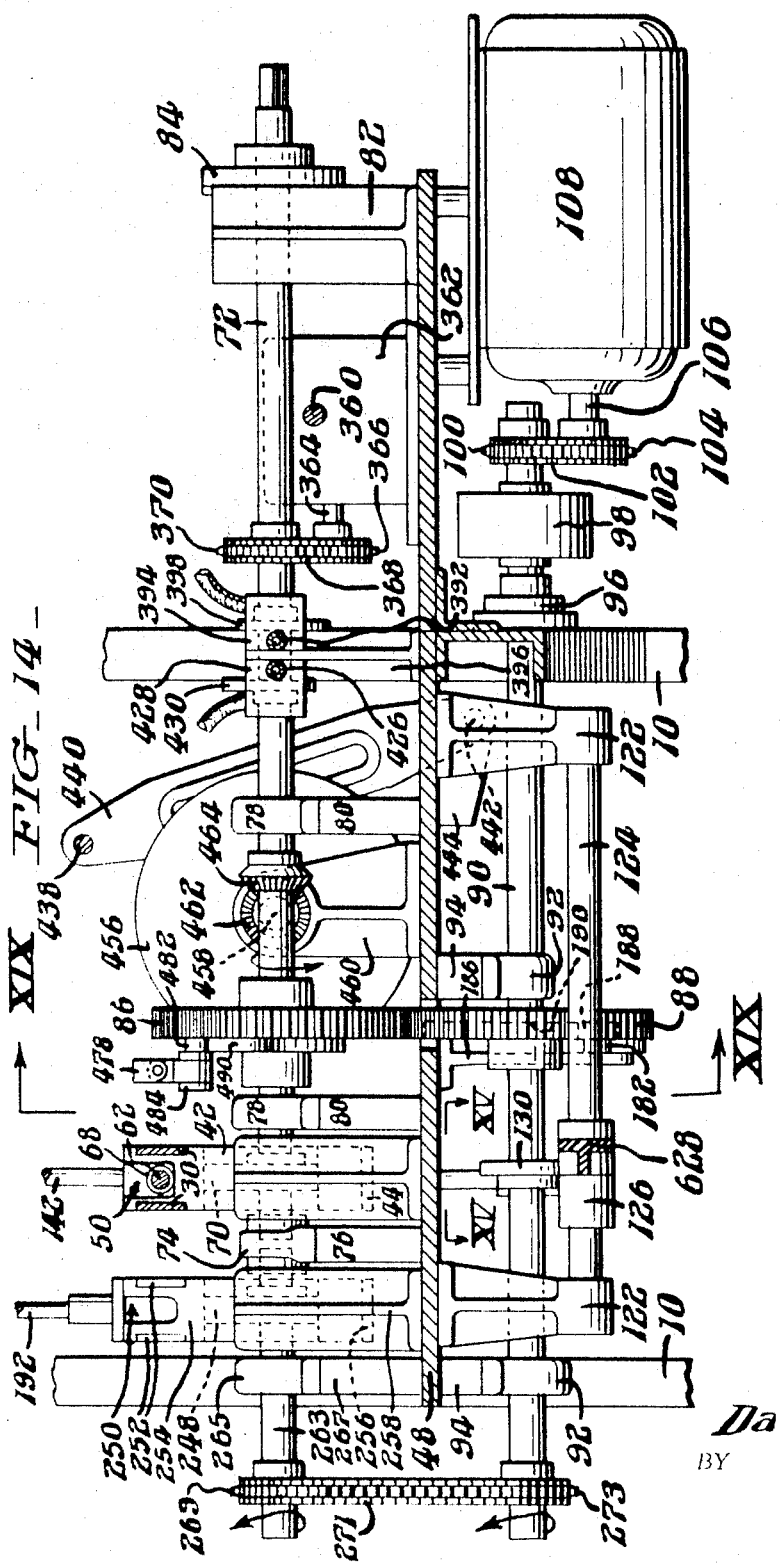

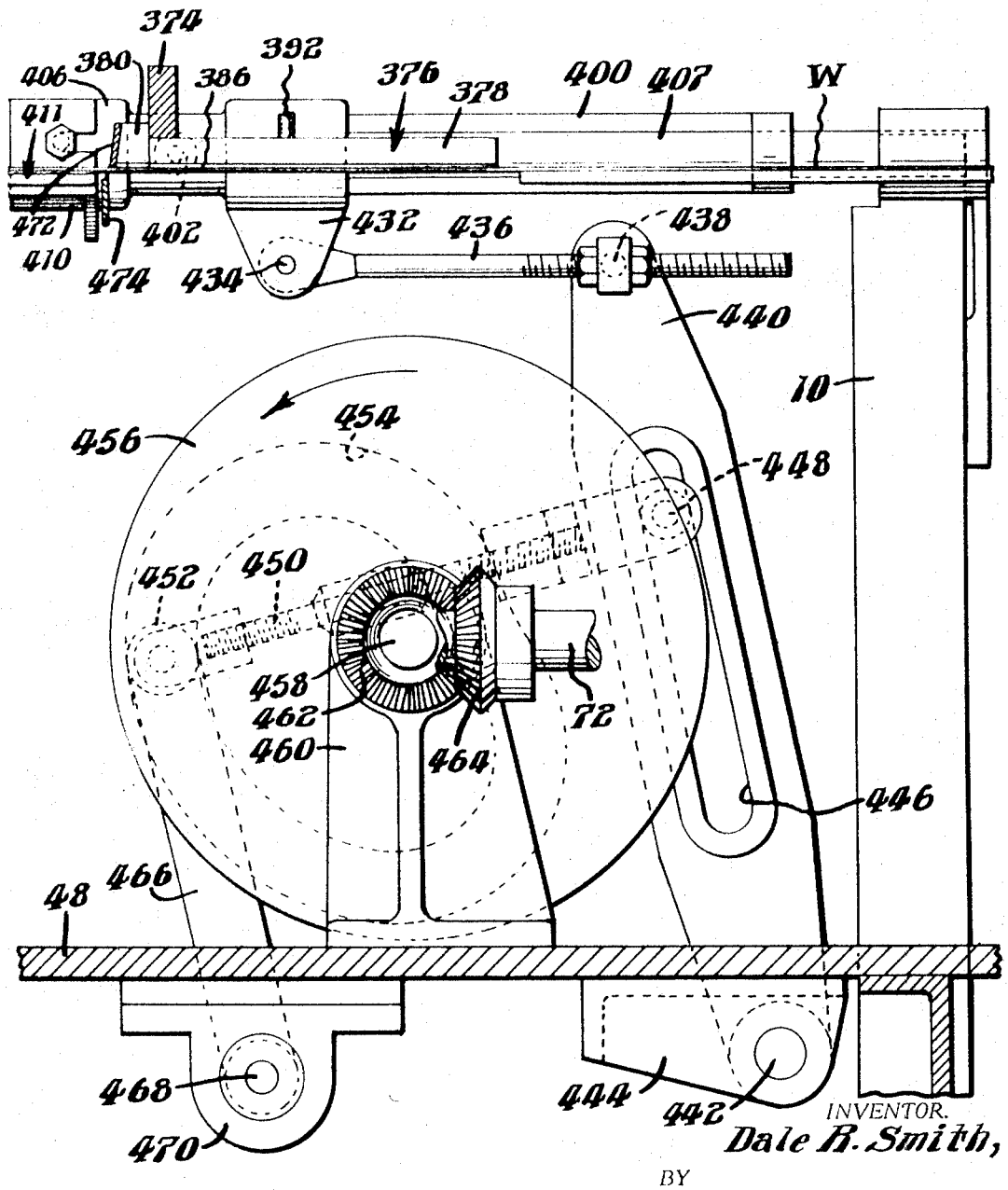

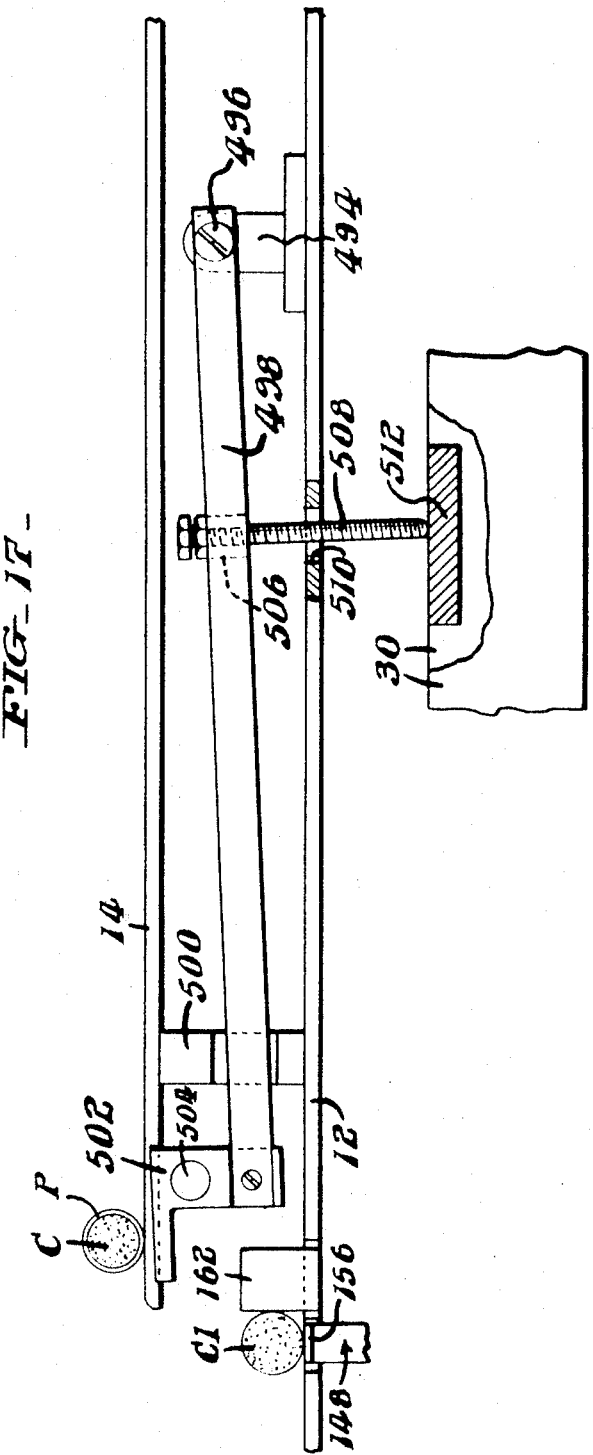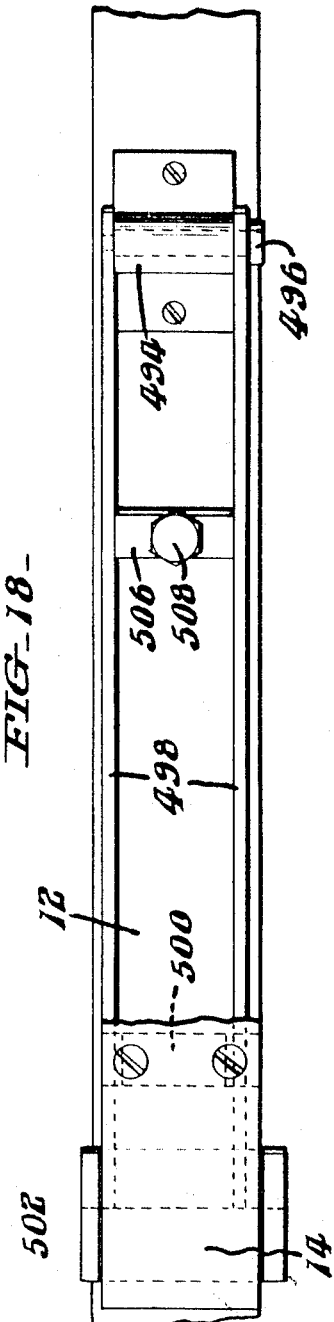

Aug. 26, 1969 D. R. SMITH 3,463,375
FEED MEANS FOR CIGAR OVERWRAPPING AND BANDING MACHINE
Original Filed July 26, 1965 15 Sheets-Sheet 15

INVENTOR.
Dale R. Smith,
BY

ATTORNEYS.

United States Patent Office 3,463,375
Patented Aug. 26, 1969

3,463,375
FEED MEANS FOR CIGAR OVERWRAPPING
AND BANDING MACHINE
Dale R. Smith, York, Pa., assignor to York Production
Engineering Co., Inc., Windsor, Pa., a corporation of
Pennsylvania
Original application July 26, 1965, Ser. No. 474,754, now
Patent No. 3,411,616, dated Nov. 19, 1968. Divided
and this application Oct. 4, 1967, Ser. No. 706,727
Int. Cl. B65h 17/18
U.S. Cl. 226—95          1 Claim

ABSTRACT OF THE DISCLOSURE

A cigar overwrapping and banding machine is disclosed in which a square motion finger rack is employed to advance cigars in a steady stream in spaced relation to each other over an infeed platform from which the cigars are successively elevated, one at a time, to the higher level of a discharge platform. Wrapping of the cigar begins at the elevator position to which a web of cellophane (or similar material) is intermittently fed by a feed mechanism. Stationary and movable suction heads coact to handle the leading end of the cellophane web to the position over the elevator, at which time it is severed from the web to form an individual wrapper.

---

This application is a division of application Ser. No. 474,754, filed July 26, 1965 by Dale R. Smith, entitled "Cigar Overwrapping and Banding Machine", now U.S. Patent 3,411,616, issued Nov. 19, 1968.

The present invention relates generally to improvements in machines for wrapping cigars and particularly to improvements in a cigar overwrapping and banding machine.

A principal object of the present invention is to provide such a machine with suction means which, in an improved manner, receives the cellophane web from the feed rolls and positions wrappers severed from the cellophane web at a cigar wrapping station.

In the drawing:

FIGURE 1 is a front elevation of the cigar overwrapping and banding machine, showing the machine at the end of a cigar advancing cycle;

FIGURE 2 shows an area of FIGURE 1 to an enlarged scale;

FIGURE 3 shows an area of FIGURE 1 to an enlarged scale, but with the end sealing unit retracted position;

FIGURE 4 is a view showing a cigar with a wrapper draped thereover and elevated from the position shown in FIGURES 1 and 2;

FIGURE 5 is a view showing one side of the wrapper being folded under the cigar;

FIGURE 6 is a view showing the other side of the wrapper being folded under the cigar;

FIGURE 7 is a rear elevation of the machine;

FIGURES 8 and 9 are fragmentary side elevations of the machine, showing mechanism for feeding the cellophane web;

FIGURE 10 is an enlarged section on line X—X, in FIGURE 9;

FIGURE 11 is a fragmentary plan view of the machine;

FIGURE 12 is a fragmentary perspective view of the machine;

FIGURE 13 is a fragmentary perspective view of mechanism for controlling the loading end of the cellophane web;

FIGURE 14 is a section on line XIV—XIV in FIGURE 1;

FIGURE 15 shows an area of FIGURE 14 to an enlarged scale;

FIGURE 17 is a view showing mechanism for preliminarily tack sealing the longitudinal extending seam of the wrapper;

FIGURE 18 is a plan view of the tacking mechanism shown in FIGURE 17;

FIGURE 20 is a perspective view of a cigar with the wrapper folded thereabout and tack sealed.

Figure 16:
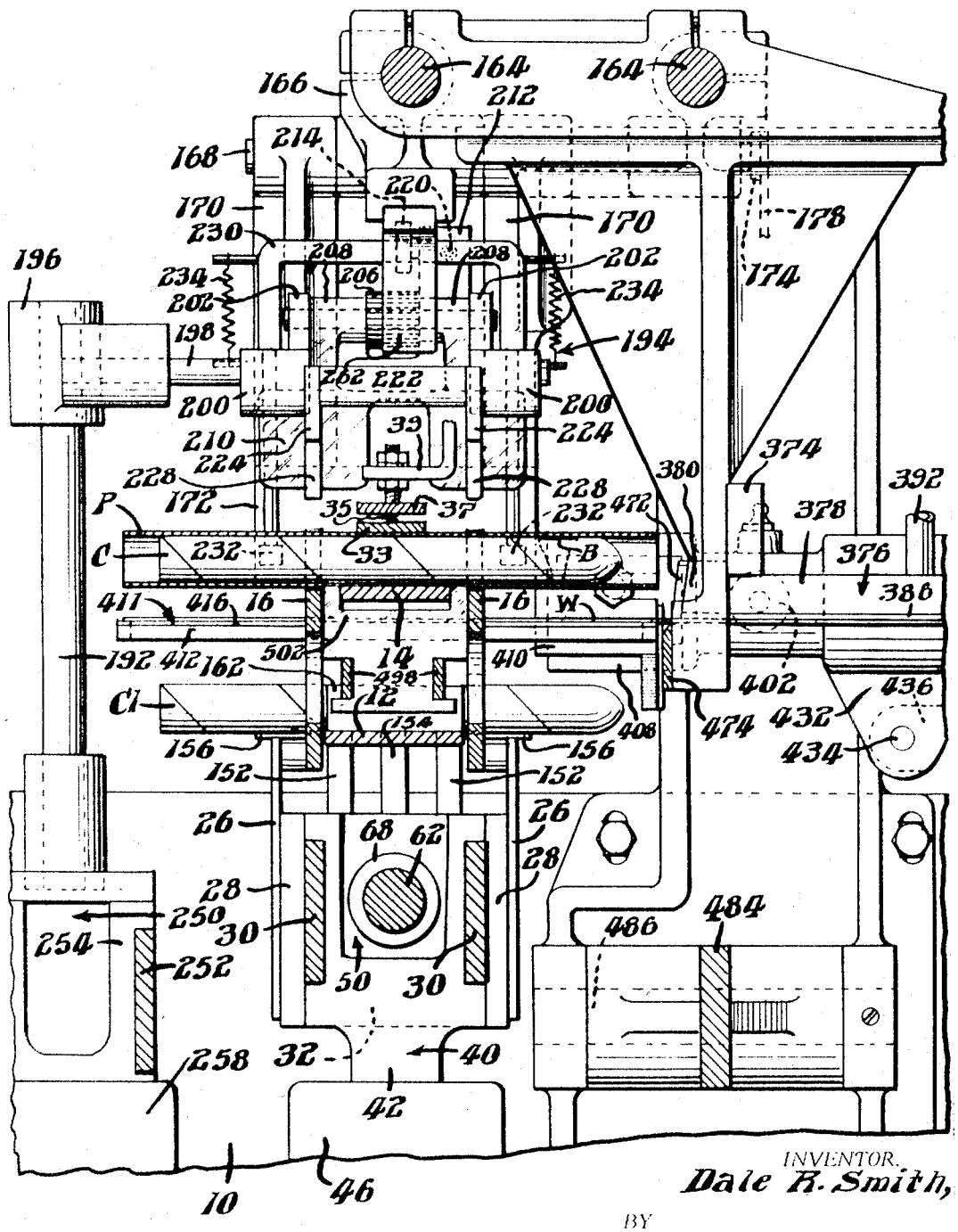
FIGURE 16 is a fragmentary, vertical, longitudinal section through the machine.

The following description is directed to the specific form of the invention shown in the drawings. It is not addressed to the scope of the invention, which may be practiced in a variety of forms.

As previously indicated, the present application is a division of parent application, Ser. No. 474,754, filed July 26, 1965, now U.S. Patent 3,411,616, issued Nov. 19, 1968.

The invention disclosed and claimed in the present divisional application relates to a portion of the wrapping operation, and specifically to the stationary and movable suction heads for handling the leading end portion of the cellophane web and conveying it to a position over the elevator by which time it is severed from the web to form an individual wrapper. The wrapper is folded about the cigar as the cigar is elevated.

Referring to FIGURES 7, 8, 9 and 10, extending upwardly from the frame 10 is a standard 264, and affixed to the upper end portion of the standard 264 is a horizontally extending arm 266. From the end of the arm 266 extend a boss 268 and a boss 272. Extending through the boss 268 is a stub shaft 274 having an enlarged end 276 forming a shoulder 278. The opposite end of the stub 274 is provided with a flat 280 which is engaged by a screw 282 threaded through the boss 268. Threaded into the end of the shaft 274 is one end of a stud 284 provided with a flange 286. Overlying the flange 286 is a plate 290 secured by screws 292. The opposite end of the stud 284 extends through the plate 290 and affixed thereto is a hand wheel 294. The stud is provided with a flat 296 which is engaged by a set screw 298 threaded through the hub of the hand wheel. Mounted upon the stub shaft 274 is a disc, generally designated 300, provided with a hub 302 which engages the arm 266, and a hub 304 with an axial extension 306 of reduced diameter. A sleeve 308 is fitted over the extension 306 and fitted with a screw 310 which engages a flat on the extension 306. Extending from the boss 272 is a pin 312 upon which is pivoted an arm 314. One end of the arm is fitted with a block 316 and a laterally extending pin 318 to which is attached one end of a tension spring 320. The spring 320 extends through a flexible tubular member 322 which overlies a circumferentially extending groove 324 formed in the hub 302 of the disc 300. The opposite end of the spring is secured to a pin 326 extending from the boss 272. Affixed to the pin 312 is an arm 328 to the free end of which is attached a tension spring 330. The opposite end of the spring 330 is attached to the arm 266. The arm 314 mounts longitudinally spaced flanged roller 332 and two flangeless rollers 334. Carried by a frame member 344 are a pair of flangeless rollers 336 and flanged roller 338.

The frame member 344 also carries a pair of feed rolls 340 mounted respectively upon shafts 342 journaled in the frame member 344 and in a tie bar 346. Also mounted upon the shafts 342 respectively are a pair of meshing gears 348, one of which meshes with a gear 350 carried by a pintle 352 engaged in an arcuate slot 354 in the member 344. The gear 350 is concentric with and is affixed to a gear 356 which meshes with a gear 358 carried by the output shaft 360 of an indexing unit 362 mounted upon the plate member 48. The indexing unit (Commercial Cam Co., Model No. B4-H20-180) is a conventional commercially available mechanism which precludes any lost motion between its input and output shafts. The input shaft 364 of the indexing unit carries a chain sprocket 366 over which is trained a chain 368. The chain 368 is also trained over a sprocket 370 mounted upon the shaft 72.

A cellophane web in the form of a roll 372 is fitted over the hub 304 of the disc 300 and secured in position by the sleeve 308. The hub 302 is drawn more or less tightly against the arm 266 by manipulating the hand wheel 294. This shifts the stub shaft 274 axially to vary the distance between the shoulder 278 and the arm 266. Spring 330 biases arm 314 counterclockwise (FIGURE 9), tensioning spring 320 and seating the tubular member 322 firmly in the groove 324. Thus the disc 300 is braked against turning freely about the stub shaft 274.

The shaft 72 makes one revolution per cycle of the machine. Sprocket 370 actuates chain 368, which turns sprocket 366 on the input shaft 364 of the indexing unit 362. The output shaft 360 and gear 358 make one revolution for every four revolutions of the shaft 72, i.e., for every four cycles of the machine. During each first one-half revolution of the shaft 72, i.e., during the first one-half of each machine cycle, the gear 358 remains at rest, and during each second one-half revolution of the shaft 72, i.e., during the second one-half of each machine cycle, the gear 358 makes one-quarter of a turn. Thus gear 358 is actuated intermittently and through gears 356, 350 and 348 actuates rolls 340 intermittently.

Web W passes about the rollers 332, 334, 336 and 338 and through the nip of the rolls 340, as shown. The rolls 40 intermediately feed web W one wrapper length at a time. Each successive pair of elements in the train thereof between the shaft 72 and the feed rolls 340 are positively engaged. Therefore, the length of web W fed is exact and no accumulation of error is possible. The length of the wrapper fed may be varied by changing the gear 350 and suitably shifting the gears 350 and 356 by adjusting the pintle 352 in the arcuate slot 354.

When the feed rolls 340 are actuated, web W is pulled from the loops thereof extending about the rollers 332, 334, 336 and 338. A pull downwardly is exerted upon the arm 314, which, aided by the pull upwardly exerted by the spring 320 pivots the arm 314 clockwise from the full line to the broken line positions shown in FIGURE 9, against the influence of spring 330. The arrangement is such that less effort is required to pull web W from the loops thereof than would be required to pull it directly from the roll 372. At the same time the braking effort of the tubular brake shoe 322 is reduced so that the disc 300 and the roll 372 are free to turn.

When the feed rolls stop feeding web W, spring 330 turns arm 314 back to its initial position against the influence of spring 320. Spring 320 gradually applies the brake 322. As the arm 314 rise, web W is pulled from the roll 372 thereof into the loops.

Referring particularly to FIGURES 2, 13, 14, 15 and 16, carried by a bar 374 is a stationary suction head, generally designated 376, provided with main body parts 378 and 380. The part 378 is provided with a channel 382 in the undersurface thereof, and the part 380 is provided with a channel 384 in the undersurface thereof communicating with the channel 382. Underlying the parts 378 and 380 is a cover plate 386 provided with a series of holes 388 communicating with the channels 382 and 384. The part 378 is provided with a bore 390 which communicates with an air hose 392 attached to one side of a valve 394. The valve is carried by a bracket 396 and is controlled by a cam 398 mounted upon the shaft 72. The other side of the valve is connected to a source of suction (not shown).

Carried by the frame 10 is a channel member 400 which accommodates a roller 402 carried by a lateral extension 404 from a sleeve 406 slidable on a shaft 407. The sleeve is also provided with a boss 408 which carries a bracket 410 upon which is mounted a movable suction head 411. The suction head comprises a horizontally extending plate 412 in the upper surface of which is provided a channel 414. Overlying the plate 412 is a cover plate 416 provided with a series of holes 418 communicating with the channel 414. Extending through both of the plates is an opening 420, and depending from opposite sides of the opening are a pair of laterally spaced flanges 422. The channel 414 communicates with a channel 424 which in turn communicates with an air hose 426 connected to one side of a valve 428 carried by the bracket 396 and operated by a cam 430 mounted upon the shaft 72. The other side of the valve is connected to a source of suction (not shown). The sleeve 406 is provided with a depending extension 432 to which is pivotally connected, as at 434, one end of a link 436. The opposite end of the link is pivotally connected, as at 438, to a link 440. The lower end portion of the link 440 is pivotally connected, as at 442, to a bracket 444 depending from the plate 48. The link 440 is provided with a longitudinally extending slot 446 which accommodates a pivot 448 adjustably fixed in the slot. The pivot is at one end of a link 450. At the other end of the link is a roller 452 working in a cam track 454 formed in a disc 456. The disc is mounted upon a shaft 458 journaled in a bearing 460 carried by the plate 48. Mounted upon the shaft 458 is a beveled gear 462 meshing with a beveled gear 464 mounted upon the shaft 72. The pin mounting the roller 452 is at the upper end of a link 466, and at the lower end of the link 466 is a pivot 468 mounted in a bearing 470 depending from the plate 48.

Figure 19:
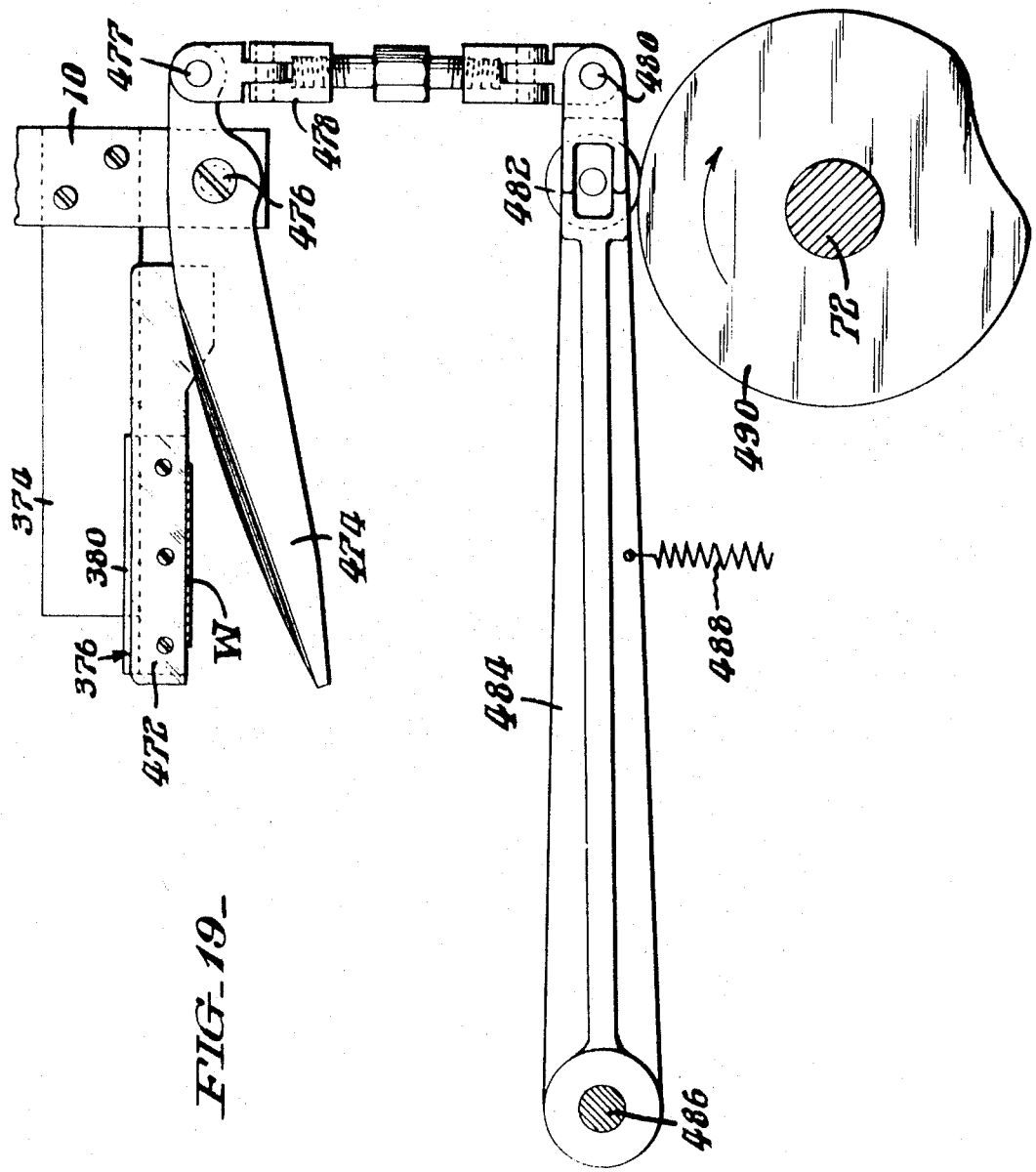
FIGURE 19 is an enlarged section on line XIX—XIX in FIGURE 14.

Referring particularly to FIGURE 19, affixed to the front of the stationary suction head 376 is a stationary cutter blade 472. Coacting with the stationary cutter blade is a movable cutter blade, designated 474, which is pivoted at 476 to the frame 10. The tail end of the blade 474 is connected, as at 477, to the upper end of link 478. The lower end of the link 478 is connected, as at 480, to one end of a lever 484 which carries a roller 482. The opposite end of the lever 484 is pivoted, as at 486, on the frame 10. The roller 482 engages a cam 490 mounted upon the shaft 72. The arm 484 is biased clockwise by a tension spring 488 as in FIGURE 19.

From the feed rolls 340, the web W extends forwardly under the plate 386 of the stationary suction head 376 and then over the plate 416 of the movable suction head 411. Valve 394 is closed by the cam 398 so that the suction head 376 does not grip the web W. Valve 428 is held open by cam 430 so that suction is effective to hold the leading end of the web W to the plate 416. The opening 420 is directly over the elevator 148.

A banding unit 492 places a band B on each wrapper length and seals the same thereto. The banding unit is conventional and forms no part of the invention. Therefore it is not described.

With the movable suction head 411 over the elevator 148, a wrapper, designated P, is severed from the web W, i.e., arm 484 swings clockwise (FIGURE 19) lowering the link 478, whereupon the blade 474 swings clockwise and blades 474 and 472 coact to shear off the wrapper. At the same time, the valve 394 is opened by cam 398 so that the stationary suction head 376 grips and holds the end of the web W. The valve 428 remains open and continues to grip and hold the wrapper cut from the web W. When the cigar is raised by the elevator 148, it passes between the guide flanges 422 and through the opening 420, whereupon the wrapper is stripped from the movable suction head 411 and draped over the cigar, as shown in FIGURE 4. The elevator 148 is immediately relowered, whereupon the movable suction head 411 is retracted, i.e., the roller 452 working in the cam track 454 swings links 466 and 440 clockwise (FIGURE 15). Link 440 thereupon pulls link 436, sleeve 406 and movable suction head 411 to the right as a unit. Roller 402, working in channel member 400, secures the sleeve 406 and the suction head 411 against turning about the shaft 407.

When the wrapper is stripped from the movable suction head 411, the valve 428 is closed by the cam 430 to cut off the suction, which remains cut off until the movable suction head 411 is directly under the stationary suction head 376 and the end of the web W held thereby. Thereupon, the valve 394 is reclosed by the cam 398 so that the stationary suction head 376 releases the web W and the valve 428 is reopened so that the movable suction head 411 grips and holds the web W.

Now the roller 452, working in the cam track 454, swings the links 466 and 440 counterclockwise back to their initial positions, and through link 436 and sleeve 406 advances the movable suction head 411 to its initial position over the elevator 148. The rate at which the movable suction head 411 advances is the same as that at which the feed rolls 340 feed the web W. Feeding of the web W begins when the forward traverse of the movable suction head begins and ends when the movable suction head reaches the end of its traverse.

It will be understood that the blade 474 is in lowered position, as shown in FIGURE 2, whenever the movable suction head 411 is in motion. In addition, the traverse of the movable suction head 411 and its extreme advanced and retracted positions may be selected by adjusting the effective lengths of the links 436 and 450 and by selectively positioning the pivot 448 in the slot 446.

Referring particularly to FIGURES 12, 17 and 18, seated upon an extension of the infeed platform, under the discharge platform, is a bearing 494 to which is pivoted, as at 496, a pair of arms 498. The arms extend freely through openings in a guide block 500 and the free ends of the arms mount a heater body 502 housing an electric heating unit 504. Spanning the arms 498 is a crossbar 506 through which is threaded an adjusting screw 508. The lower extremity of the screw extends through an opening 510 in the infeed platform extension and rests upon a plate 512 carried by the plate members 30 of the frame 40.

As mentioned hereinabove, when the cigar is raised by the elevator 148, it passes between the guide flanges 422 and through the opening 420, whereupon the wrapper is draped over the cigar, as shown in FIGURE 4. As the elevator begins its return movement, the plate 172 swings into position to support the cigar and to simultaneously fold one side of the wrapper under the cigar, as in FIGURE 5. As the cigar is moved onto the discharge platform, the leading side of the wrapper is folded under the cigar, as in FIGURE 6. The tack heater 502 is in raised position at this time, therefore, the cigar passes thereover and the wrapper is tacked, as at 514, FIGURE 20. The tack heater is raised and lowered by the frame 40.

What is claimed is:
1. In a cigar overwrapping and banding machine:
 (a) a wrapping station,
 (b) means for intermittently feeding predetermined lengths of a web of wrapping material toward said wrapping station,
 (c) stationary and reciprocal suction heads adjacent opposite faces of said web,
 (d) said stationary suction head being upstream from said wrapping station, said reciprocal suction head being downstream of said stationary suction head when disposed at said wrapping station, and being movable upstream to a position opposed to said stationary suction head,
 (e) means for applying suction to said web alternatively by means of said stationary and reciprocal suction heads,
 (f) said stationary suction head being provided with a multiplicity of holes in the surface thereof through which suction is applied to the web for securing it in position while the reciprocal suction head moves upstream from the wrapping station to its position opposite the stationary suction head,
 (g) said reciprocal suction head being provided with an elongated opening for passage of cigars therethrough, and with a multiplicity of holes in the surface thereof extending along each side of said opening through which suction is applied to the longitudinally-extending marginal areas of the web while the reciprocal suction head is moving downstream from its position opposite said stationary suction head to the wrapping station.

References Cited

UNITED STATES PATENTS

| | | | |
|---|---|---|---|
| 3,149,767 | 9/1964 | Carlson | 226—95 |
| 3,170,353 | 2/1965 | Wheeler et al. | 226—95 X |

ALLEN N. KNOWLES, Primary Examiner

U.S. Cl. X.R.

226—115, 158

PO-1050
(5/69)

UNITED STATES PATENT OFFICE
CERTIFICATE OF CORRECTION

Patent No. 3,463,375            Dated August 26, 1969

Inventor(s) Dale R. Smith

It is certified that error appears in the above-identified patent and that said Letters Patent are hereby corrected as shown below:

Column 6, lines 20-21, change "alternatively" to --alternately--

SIGNED AND
SEALED

DEC 23 1969

(SEAL)
Attest:

Edward M. Fletcher, Jr.
Attesting Officer

WILLIAM E. SCHUYLER, JR
Commissioner of Patents